United States Patent [19]

Hashimoto et al.

[11] Patent Number: 6,119,168
[45] Date of Patent: *Sep. 12, 2000

[54] COMMUNICATIONS SYSTEM USABLE AS SYSTEM FOR SIMULATING A PLURALITY OF OTHER COMMUNICATIONS SYSTEMS AND COMMUNICATION PROCESSING SYSTEM HAVING SUCH COMMUNICATIONS SYSTEM

[75] Inventors: Mitsuhiro Hashimoto; Hitoshi Komori, both of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,270

[22] Filed: Oct. 31, 1996

Related U.S. Application Data

[63] Continuation of application No. 08/250,519, May 27, 1994, abandoned.

[30] Foreign Application Priority Data

Jun. 28, 1993  [JP]  Japan ................................. 5-156924

[51] Int. Cl.⁷ .................................................. G06F 15/16
[52] U.S. Cl. ........................................................ 709/238
[58] Field of Search ............................. 395/500; 709/238

[56] References Cited

U.S. PATENT DOCUMENTS

| | | | |
|---|---|---|---|
| 3,993,981 | 11/1976 | Cassarino et al. ................. | 395/294 |
| 4,271,507 | 6/1981 | Gable ................................ | 370/94 |
| 4,661,947 | 4/1987 | Lea et al. ......................... | 370/60 |
| 5,185,860 | 2/1993 | Wu .................................. | 395/200 |
| 5,289,579 | 2/1994 | Punj ................................. | 395/200 |
| 5,335,339 | 8/1994 | Maejima et al. ................. | 395/500 |
| 5,394,540 | 2/1995 | Barrington et al. .............. | 395/500 |

*Primary Examiner*—David Y. Eng
*Attorney, Agent, or Firm*—Helfgott & Karas, PC.

[57] ABSTRACT

In a communication processing system, a message provided with an originating address and a destination address is transmitted via a network from a communications system identified by the originating address to a communications system identified by the destination address. When a message is received, an address defined as the destination address for the message received by the communications system and a receiving address indicated by a management unit are respectively replaced with an address defined as a new originating address and an address defined as a new destination address so that the communications system recognizes that the message is transmitted from a communications system identified by the address defined as the new originating address and the message should be received by the communications system identified by the address defined as the new destination address. When a message is transmitted, an address originally defined as the destination address for the message to be transmitted and a transmitting address indicated by the management unit are respectively replaced with an address defined as a new originating address and an address defined as a new destination address and the message is actually transmitted to a communication systems identified by the address defined as the new destination address.

5 Claims, 12 Drawing Sheets

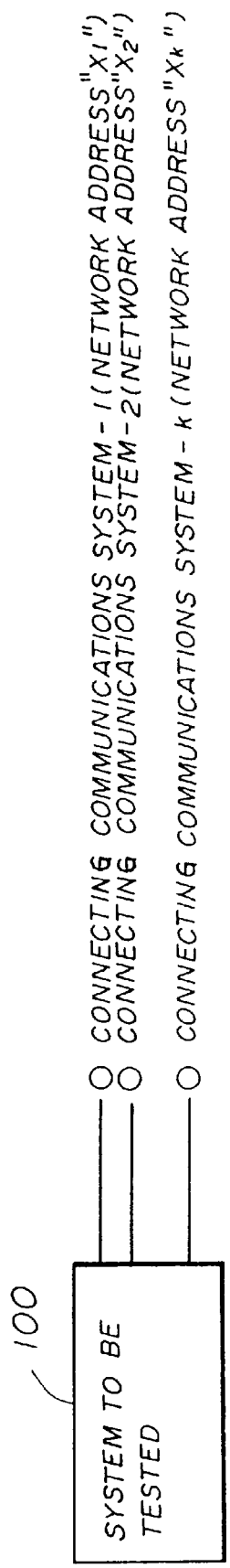
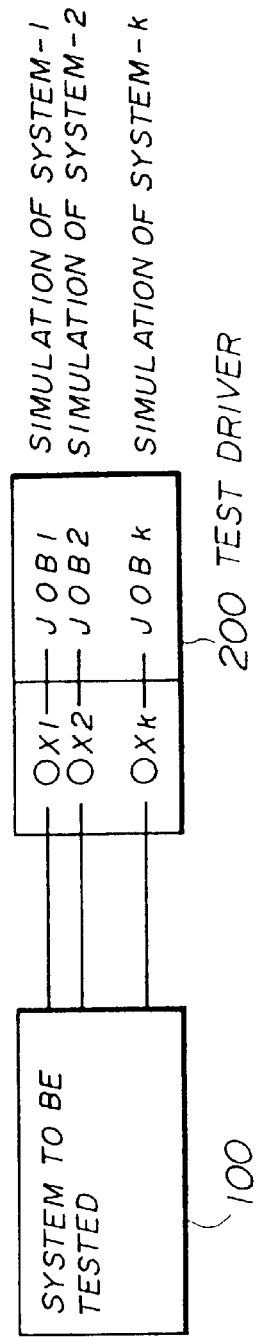

COMMUNICATIONS SYSTEM USABLE AS SYSTEM FOR SIMULATING A PLURALITY OF OTHER COMMUNICATIONS SYSTEMS AND COMMUNICATION PROCESSING SYSTEM HAVING SUCH COMMUNICATIONS SYSTEM

This is a continuation of application Ser. No. 08/250,519, filed May 27, 1994 now abandoned.

BACKGROUND OF THE INVENTION (1) Field of the Invention

The present invention generally relates to a a communications system usable as a system for simulating a plurality of other communications systems and a communication processing system having the communications system, and more particularly to a communications system usable as a test driver for testing a communications system connected thereto performing simulation of a plurality of other communications systems and a communication processing system in which a plurality of communications systems are connected by a network, each of the communications systems receiving messages from other communications systems and transmitting messages to other communications systems, at least one of the communications systems being usable as a test driver for testing another communications system.

(2) Description of the Related Art

In a communication processing system in which a plurality of communications systems are connected to each other by a network, each of the communications systems is identified by a network address. In, for example, a connection-oriented network protocol (CONP) which has been widely used in an OSI (Open Systems Interconnection) communication in a line, network addresses of an originating system and a destination are transmitted as parameters of a calling request packet when the network connection is established. After the network connection is established, it is presumed that a communication of information in the network connection is a communication between systems identified by the two network addresses. In addition, in a connectionless network protocol (CLNP) which has been widely used in the OSI communication in a LAN (Local Area Network), every time network data is transmitted or received, network addresses of an originating system and a destination are added to the network data, and it is presumed that a communication of information regarding the network data is a communication between the systems identified by the two network addresses.

In a conventional communication processing system, each communications system has no function of converting network addresses of other communications systems. That is, when a destination network address transmitted from another communications system is equal to a network address identifying a communications system, the communications system receives messages from another communications system and the messages are processed by a processing unit in accordance with a data processing program. Messages obtained as processed results by the processing unit are then supplied to the network along with a destination network address determined by the processing unit, and the messages are transmitted to another communications system identified by the destination network address.

When this communication processing system in which a plurality of communications systems are connected by the network are constructed, an operating test of a communications system is carried out using a test driver system which simulates a plurality of communications systems connected to the communications system to be tested. That is, in a case, as shown in FIG. 1A, where a communications system 100 to be tested is connected to communications systems-1, -2, . . . and -k which are respectively identified by network addresses X1, X2, . . . and Xk, a test driver system 200 is connected to the communications system 100 to be tested as shown in FIG. 1B. The test driver system 200 receives, instead of the actual communications systems-1, -2, . . . and -k, messages transmitted from the communications system 100 to be tested. The test driver system 200 has application programs JOB1, JOB2, . . . and JOBk which are respectively used to simulate operations of the communications systems-1, -2, . . . , and -k. The application programs JOB1, JOB2, . . . and JOBk are activated to process the received messages, and the processing results obtained by the application programs JOB1, JOB2, . . . and JOBk are then returned from the test driver system 200 to the communications system 100 to be tested. That is, the communications system 100 receives the processing results as a test result.

It is preferable that the operating test of the communications system 100 should be carried out in a state as similar to an actual operating state as possible. Thus, conventionally, a test driver system for simulating a large number of communications systems actually connected to a communications system to be tested is formed as a dedicated system.

However, to prepare the test driver system which is dedicated to the communications system to be tested, large amounts of money and time are needed. In addition, since the conventional test driver system is dedicated to the communication system to be tested, the conventional test driver system is not used as an actual communications system of course.

To eliminate the above disadvantages, it is possible to construct the test driver system using an actual communications system which can be provided in the network. However, in this case, the following disadvantages occur.

In, for example, an OSI network, an NSAP (Network Service Access Point) identifying an open system is used as a network address. Each OSI system normally has a single NSAP address. Thus, even if the test driver system is constructed using the current OSI system, the test driver system can simulate only one OSI system. That is, the operating test of the OSI network in which a few thousands number of OSI systems are connected to each other can not be simulated in a state similar to the actual operations.

There is also an OSI system to which a plurality of NSAP addresses are assigned. This OSI system has a function for separately using the plurality of NSAP addresses with respect to other OSI systems. Thus, if the test driver system is formed using this OSI system, it is possible to simulate the number of OSI systems which number is equal to the number of NSAP addresses. However, the communications system to be tested must have the function regarding the plurality of NSAP addresses. As a result, the operation circumstances of the communications system to be tested must be changed to those different from the actual operations, so that the validity of the operating test deteriorates. Furthermore, even if the communications system has the function for separately using a plurality of NSAP addresses, due to the limitation of the number of OSI systems which can be simulated, the operation test cannot be carried out in the state similar to the actual operations.

Actually, only a few tens NSAP addresses at most are assigned to the OSI system. Thus, the testing operation with respect to the OSI system to which a few thousand OSI systems are to be connected cannot be carried out in the state similar to the actual operations.

Furthermore, there is a disadvantage regarding application programs used to simulate services in the test driver system. That is, each of the application programs must be provided in the test driver system so as to correspond to one of the network addresses, as shown in FIG. 1B. Thus, in a case where the test driver system is constructed using a communications system having a plurality of network addresses, the number of operations which can be carried out must be equal to the number of communications systems simulated by the test driver system. However, the number of operations may be limited, and the cost required to carry out the operations is increased.

SUMMARY OF THE INVENTION

Accordingly, a general object of the present invention is to provide a communications system and a communication processing system having a plurality of communications systems connected to each other, in both of which the disadvantages of the aforementioned prior art are eliminated.

A specific object of the present invention is to provide a communications system which can easily function as a large number of communications systems.

The above objects of the present invention are achieved by a communications system to be provided in a communication processing system in which a plurality of communications systems are connected to each other by a network, a message provided with an originating address and a destination address being transmitted via the network from a communications system identified by the originating address to a communications system identified by the destination address, the communications system comprising: management means for indicating at least a receiving address identifying a communications system which should receive a message; and converting means for respectively converting an address defined as the destination address for the message received by the communications system and the receiving address indicated by the management means to an address defined as a new originating address and an address defined as a new destination address, wherein the communications system recognizes that the message is transmitted from a communication system identified by the address defined as the new originating address and the message should be received by a communications system identified by the address defined as the new destination address, the communications system carrying out a process based on the recognition result.

The above objects of the present invention are also achieved by a communications system to be provided in a communication processing system in which a plurality of communications systems are connected to each other by a network, a message provided with an originating address and a destination address being transmitted via the network from a communications system identified by the originating address to a communications system identified by the destination address, the communications system comprising: management means for indicating at least a transmitting address identifying a communications system to which a message should be transmitted; and converting means for respectively converting an address originally defined as the destination address for the message to be transmitted by the communications system and the transmitting address indicated by the management means to an address defined as a new originating address and an address defined as a new destination address, wherein the communications system recognizes that the message is transmitted to a communications system identified by the address originally defined as the destination address but the message is actually transmitted to a communication system identified by the address defined as the new destination address.

The above objects of the present invention are also achieved by a communications system to be provided in a communication processing system in which a plurality of communications systems are connected to each other by a network, a message provided with an originating address and a destination address being transmitted via the network from a communications system identified by the originating address to a communications system identified by the destination address, the communications system comprising: management means for indicating at least a receiving address identifying a communications system which should receive a message and a transmitting address identifying a communications system to which a message should be transmitted; first converting means, when a message is received by the communications system, for respectively converting an address defined as the destination address for the message received by the communications system and the receiving address indicated by the management means to an address defined as a new originating address and an address defined as a new destination address, wherein the communications system recognizes that the message is transmitted from a communication system identified by the address defined as the new originating address and the message should be received by a communications system identified by the address defined as the new destination address; processing means for performing a process based on the recognition result so that a message corresponding to a result of the process is obtained, an address defined as the destination address for the message obtained by the processing means being equal to the address defined as the new originating address for the message received by the communications system; and second converging means, when the message corresponding to the result of the process is transmitted from the communications system, for respectively converting the address defined as the destination address for the message obtained by the processing means and the transmitting address indicated by the management means to an address defined as a new originating address and an address defined as a new destination address, wherein the communications system recognizes that the message obtained by the processing means is transmitted to a communications system identified by the address originally defined as the destination address but the message is actually transmitted to a communications system identified by the address defined as the new destination address.

According to the present invention, due to conversion of addresses each of which identifies a communications system provided in the communication processing system, the communications system can easily function as a large number of communications systems. As a result, the communications system can simulate a large number of communications systems connected to a communications system to be tested.

BRIEF DESCRIPTION OF THE DRAWINGS

FIG. 1A is a block diagram illustrating a communications system to be tested.

FIG. 1B is a block diagram illustrating a test driver system connected to the communications system to be tested.

DESCRIPTION OF PREFERRED EMBODIMENTS

First, a description will be given, with reference to FIGS. 2A, 2B and 2C, of the principle of a communications system according to an embodiment of the present invention.

Figure 2A:
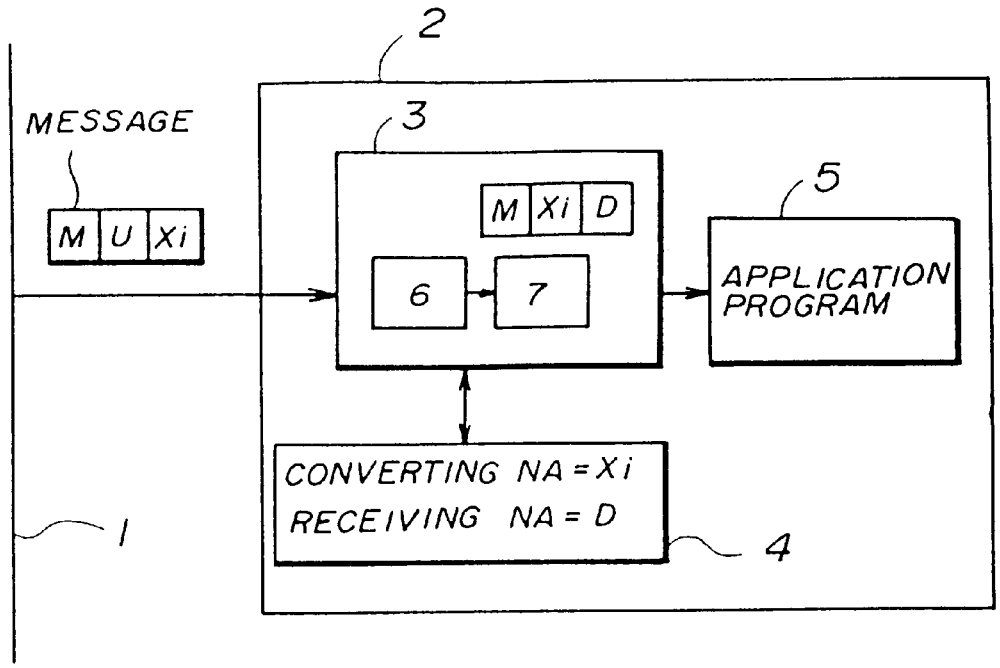
FIG. 2A is a block diagram illustrating the principle of a receiving function provided in a communications system according to an embodiment of the present invention.
Figure 2B:
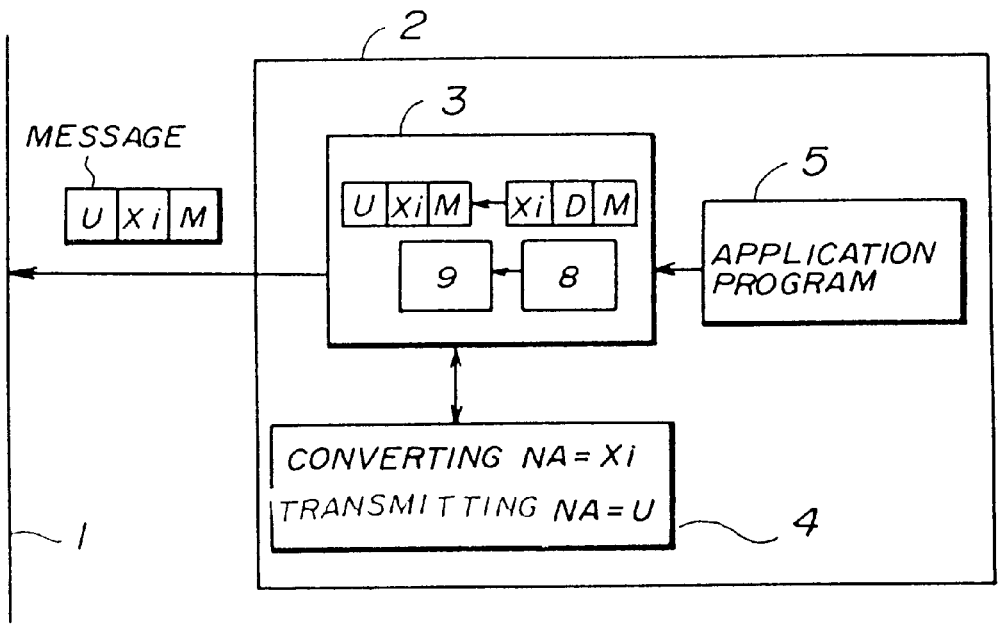
FIG. 2B is a block diagram illustrating the principle of a transmission function provided in the communications system according to the embodiment of the present invention.

A communications system 2 shown in FIGS. 2A and 2B is connected to a network 1, the communication system 2 shown in FIG. 2A having a function for receiving messages from an originating communications system, and the communication system 2 shown in FIG. 2B having a function for transmitting messages to a destination communications system.

Referring to FIG. 2A, the communications system 2 has a communication control unit 3, a network definition management unit 4 and an application program unit 5. The communication control unit 3 controls receiving operation for messages. The network definition management unit 4 manages network definition information required in processes executed by the communication control unit 3. The application program unit 5 receives messages from the originating communications system and processes them in accordance with predetermined application programs. In the network definition management unit 4, network addresses (Xi) of communications systems which addresses are to be converted or replaced are managed as converting or replacing network addresses, and a network address (D) of a communications system which should receive messages is managed as receiving network address (there is a case where the network address (D) identifies the communication system 2 itself) so that the converting or replacing network addresses correspond to the receiving network address. The communication control unit 3 has a determination unit 6 and a converting or replacing unit 7. A message (M) transmitted from an originating communication system to the communication system 2 is provided with an originating network address for identifying the originating communication system and a destination network address for identifying a destination system. The determination unit 6 determines whether or not a network address (Xi) defined as the destination network address in the message (M) is managed as the converting or replacing address by the network definition management unit 4. If the determination unit 6 determines that the network address (Xi) is managed as the converting address by the network definition management unit 4, the converting or replacing unit 7 replaces the network address (Xi) defined as the destination address for the message (M) with an address defined as a new originating address in the message (M). At this time, the converting unit 7 also replaces the network address (D) managed as the receiving network address by the network definition management unit 4 with an address defined as a new destination network address for the message (M). That is, the network address (Xi) is set as the new originating network address substituting for the network address (U), and the network address (D) identifying the communication system which should receive messages is set as the new destination address substituting for the network address (Xi).

Thus, when the originating communications system identified by the network address (U) transmits the message (M) to the communications system identified by the network address (Xi), this communications system 2 can recognize that the message (M) is transmitted from a communications system identified by the network address (Xi). In a case where the network address (D) identifies this communications system 2, the message (M) is supplied to the application program unit 5. On the other hand, in a case where the network address (D) identifies another communications system, this communications system 2 may relay the message (M) to the communications system identified by the network address (D).

The communications system 2 shown in FIG. 2B has the communication control unit 3, the network definition management unit 4 and the application program unit 5 in the same manner as the communications system 2 shown in FIG. 2A. In the network definition management unit 4, network addresses (Xi) of communications systems which addresses are to be converted replaced are managed as converting or replacing network addresses, and a network address (U) of a communications system to which a message should be transmitted is managed as transmitting network address so that the converting or replacing network addresses correspond to the transmitting network address. The communication control unit 3 has a determination unit 8 and a converting unit 9. A message (M) transmitted from this communications system 2 to a destination is provided with an originating network address for identifying an originating communication system and a destination network address for identifying a destination. The determination unit 8 determines whether or not a network address (Xi) provided as the destination network address in the message (M) to be transmitted is managed as the converting or replacing address by the network definition management unit 4. If the determination unit 8 determines that the network address (Xi) is managed as the converting address by the network definition management unit 4, the converting unit or replacing 9 replaces the network address (Xi) defined as the destination address for the message (M) to be transmitted with an address defined as a new originating network address. At this time, the converting unit 9 also replaces the network address (U) managed as the transmitting network address by the network definition management unit 4 with to an address defined as a new destination network address for the message (M) to be transmitted. That is, the network address (Xi) is set as the new originating network address substituting for the network address (D), and the network address (U) identifying the communication system to which messages should be transmitted is set as the new destination address substituting for the network address (Xi).

Thus, this communications system 2 identified by the network address (D) recognizes that the message (M) should be transmitted to the communications system identified by the network address (Xi), but the message (M) is actually transmitted to a destination identified by the network address (U) via the network 1. The destination recognizes that the message (M) is transmitted from the communications system identified by the network address (Xi).

A test driver system for testing a communications system connected to a plurality of other communications systems can be formed of a communications system to which the above functions provided in the communications systems 2 shown in FIGS. 2A and 2B is added. The test driver system simulates can simulate a large number of communications systems, so that the communications system can be tested in a state similar to the actual operation.

That is, in a communications system used as the test driver system, network addresses (Xi) of a plurality of other communications systems to be simulated, a network address (D) of this communications system and a network address (U) of a communications system to be tested are respectively provided as the converting or replacing addresses, the receiving address and the transmitting address in the network definition management unit 4. A message for which a network address (Xi) of a communications system to be simulated is defined as the destination network address and a network address (U) of the communications system to be tested is defined as the originating communications system is supplied from the communications system to be tested to the test driver system. In the test driver system, the determination unit 6 determines whether or not the network address (Xi) defined as the destination network address in the message is provided as the converting or replacing network address in the network definition management unit 4. Based on the result obtained by the determination unit 6, the converting or replacing unit 7 sets the network address (Xi) as a new originating network address and sets the network address (D), managed as the receiving address by the network address definition management unit 4, as a new destination network address. That is, the destination network address and the originating network address provided in the message are respectively changed from the network addresses (Xi) and (U) to those (D) and (Xi). As a result, the test driver system identified by the network address (D) receives, substituting for the communications system identified by the network address (Xi), the message transmitted from the communications system identified by the network address (U).

The message transmitted from the communications system to be tested is then supplied to the application program unit 5 of the test driver system. The application program unit 5 simulates processes of the communication system identified by the network address (Xi) in response to the message. A message corresponding to the result of the simulation is generated by the application program unit 5. The message corresponding to the simulation result is provided with the network address (Xi) of the simulated communications system defined as the destination network address and the network address (D) of the test driver system defined as the originating network address. The determination unit 8 of the test driver system determines whether the network address (Xi) defined as the destination network address in the message is provided as the converting or replacing network address in the network definition management unit 4. When the network address (Xi) is provided as the converting network address in the network definition management unit 4, the converting unit 9 sets the network address (Xi) as a new originating network address and sets the the network address (U), managed as the transmitting network address by the network definition management unit 4, as a new destination network address. That is, the destination network address and the originating network address provided in the message corresponding to the simulation result are respectively changed from the network addresses (Xi) and (D) to those (U) and (Xi). As a result, the message corresponding to the simulation result is transmitted to the communications system identified by the network address (U) which system is to be tested. The communications system to be tested recognizes that the message corresponding to the simulation result is transmitted from the communications system identified by the network address (Xi).

Figure 2C:
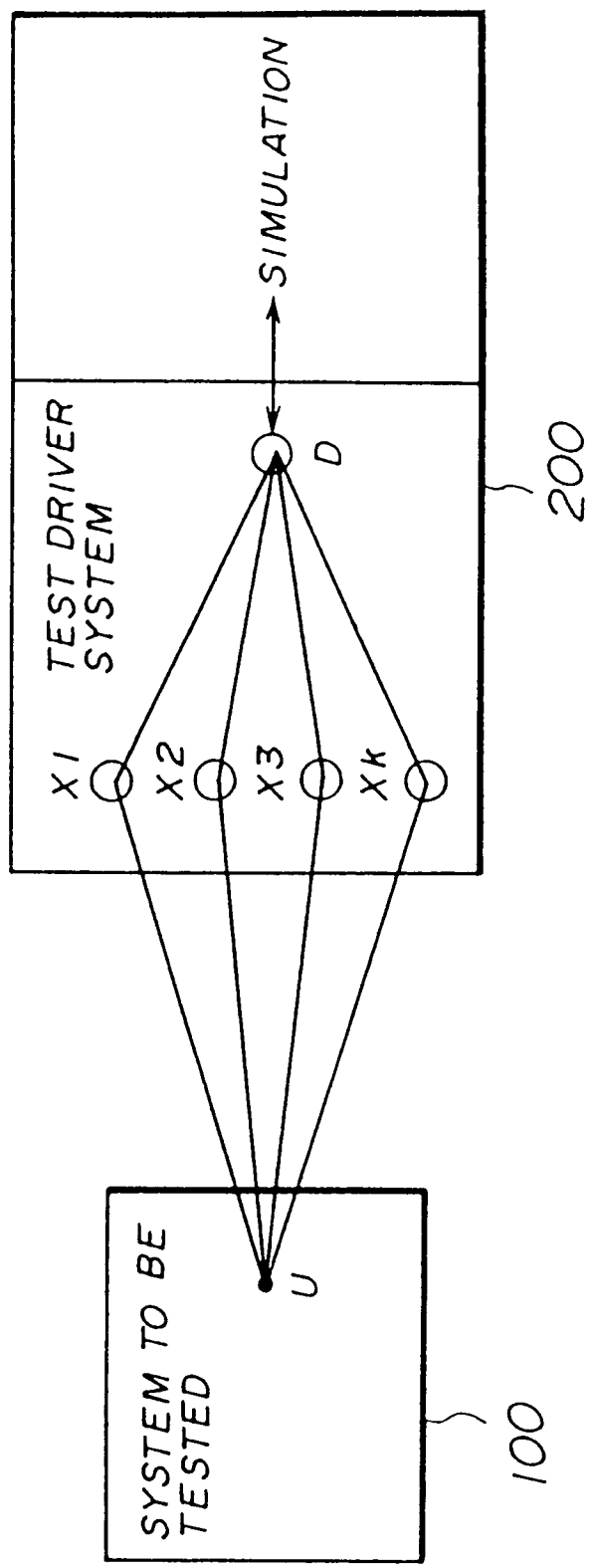
FIG. 2C is a block diagram illustrating an essential structure of a test driver system formed of the communication system provided with the receiving and transmission functions shown in FIGS. 2A and 2B.

As has been described above, the test driver system 200 for simulating a plurality of communications systems identified by network addresses X1, X2, . . . can be formed using a normal communications system identified by the network address (D) as shown in FIG. 2C. The communications system 100 identified by the network address (U) recognizes that the communications system 100 is connected to the plurality of communications systems identified by the network addresses X1, X2,. . . .

A plurality of network addresses may be assigned to the test driver system. In this case, the application program unit 5 has simulating functions each of which correspond to one of the plurality of network addresses, the simulation process is performed in accordance with a simulation function identified by a network address obtained as the new destination network address by the converting unit 7.

In addition, the test driver system may be a plurality of systems. In this case, the test driver system is formed, for example, of a system (corresponding to a layer higher than the network layer in the OSI system) in which the conversion of network addresses is carried out in a system without regard to the conversion of the network addresses.

A description will now be given of an embodiment of the present invention.

Figure 3:
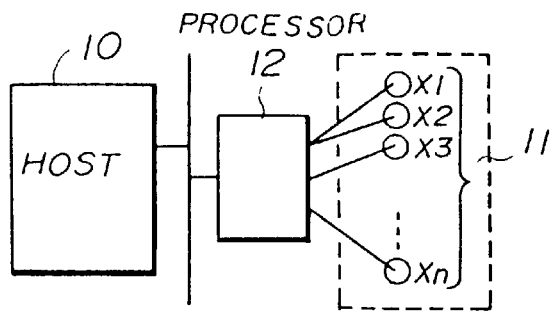
FIG. 3 is a block diagram illustrating a communication processing system including a communications system to be tested.

FIG. 3 shows a communication processing system in which a plurality of communication systems are connected.

Referring to FIG. 3, a communications system 100 has a host computer 10 and a front-end processor 12 connected to the host computer 10. A plurality of OSI terminals 11 (communications systems) are accommodated into the front-end processor 12 of the communication system. That is, a communication processing system is constructed of the communication system 100 having the host computer 10 and the front-end processor 12 and the plurality of OSI terminals 11.

Figure 4:
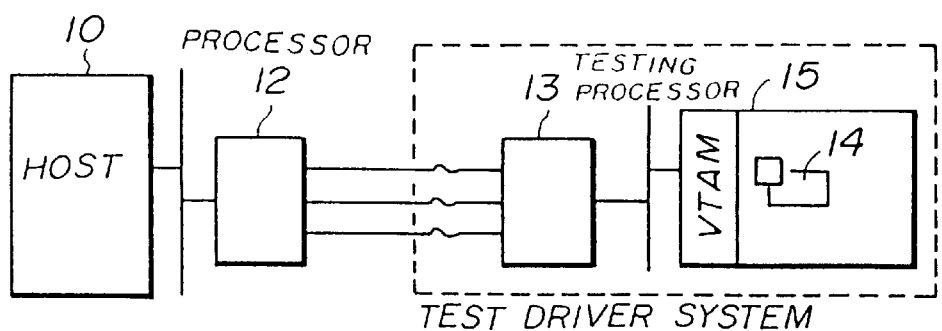
FIG. 4 is a block diagram illustrating a test driver system for testing the communications system shown in FIG. 3.

In a case where operations in a network system between the host computer 10 of the communications system 100 and the plurality of OSI terminals 11 are tested, a test driver system 200 is connected to the communications system 100 as shown in FIG. 4. Referring to FIG. 4, the test driver system 200 has a testing front-end processor 13 and a test driver host 15 to which the testing front-end processor 13 is connected. The testing front-end processor 13 is connected, instead of to the actual OSI terminals 11, to the front-end processor 12 of the communications system 100. The test driver host 15 has simulating application programs 14 used to simulate the actual OSI terminals 11. The test driver host 15 also has a VTAM (Vertical Telecommunications Access Method) unit used to perform communication between the testing front-end processor 13 and the simulating application programs 14.

Figure 5:
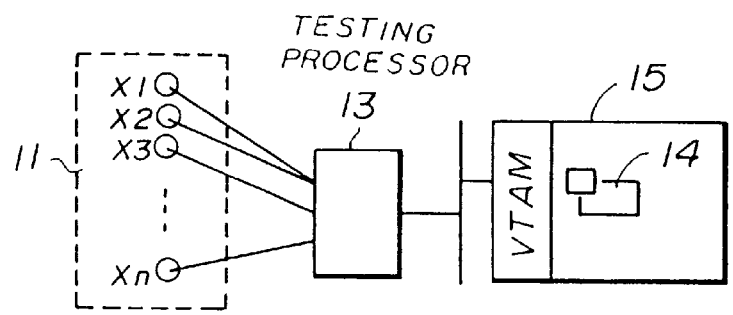
FIG. 5 is a block diagram illustrating a state where the test driver system virtually communicates with a plurality of OSI terminals.

The simulating application programs 14 of the test driver host 15 are executed as if the test driver host 15 communicates with the OSI terminals 11 as shown in FIG. 5, so that the OSI terminals 11 are simulated. That is, the test driver system 200 receives messages from the communication system 100 having the host computer 10 instead of each of the OSI terminals 11 which should originally receive the message and processes the received message in accordance with the simulating application programs 14, and the simulated processing results are returned to the host computer 10 of the communication system 100. As a result, a network system between the host computer 10 and the OSI terminals is tested.

Figure 6:
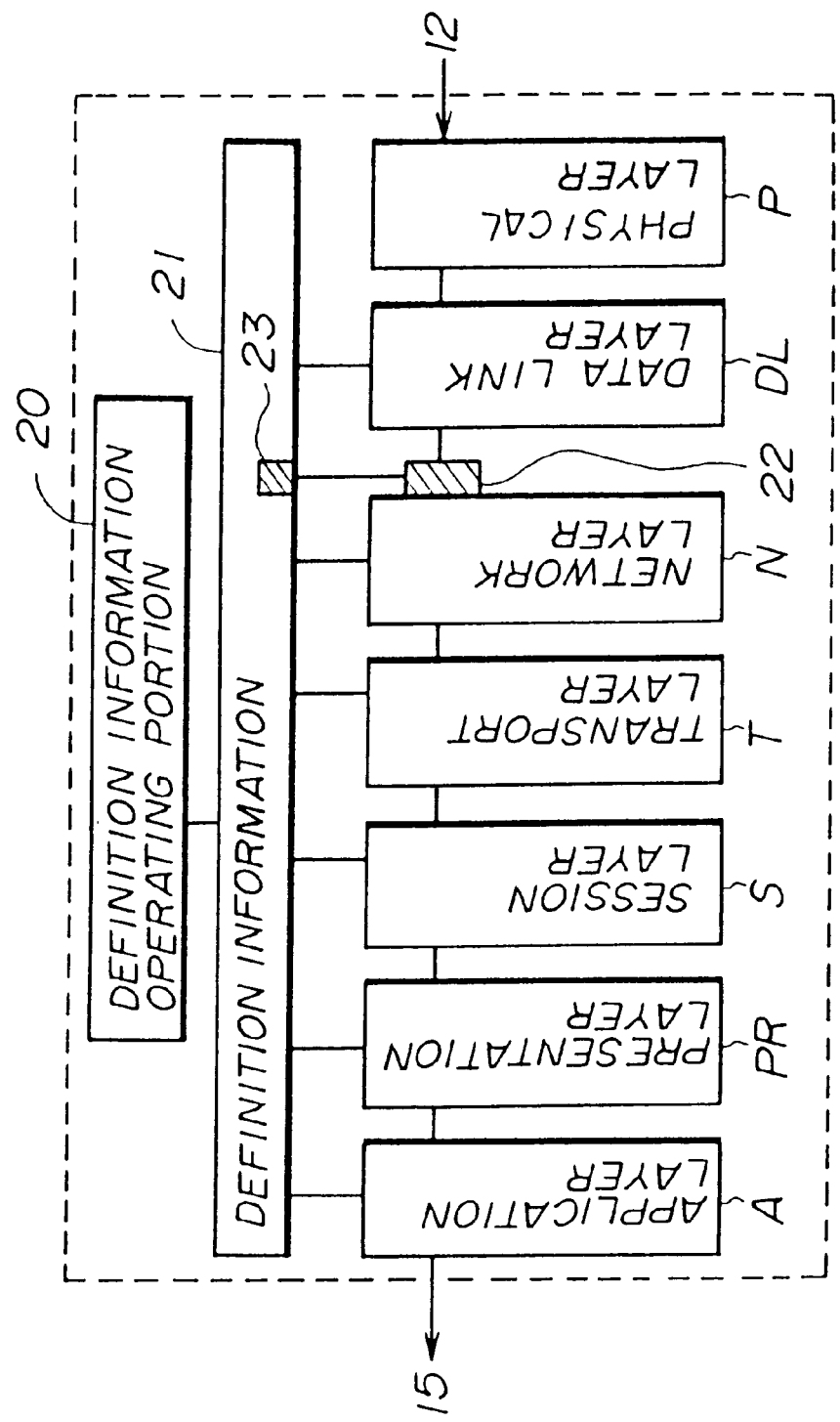
FIG. 6 is a block diagram illustrating a functional structure of testing front-end processor.

FIG. 6 shows a layer structure of the OSI function provided in the testing front-end processor 13. Referring to FIG. 6, the testing front-end processor 13 has, in the same manner as a normal OSI system, a seven layers structure of a physical layer processing portion (P), a data-link layer processing portion (DL), a network layer processing portion (N), a transport layer processing portion (T), a session layer processing portion (S), a presentation layer processing portion (PR) and an application layer processing portion (A). The respective processing portions execute predetermined communication control processes with reference to definition information 21 set by a definition information operating portion 20.

When the test driver host 15 is connected to the testing front-end processor 13, due to functions of the test driver host 15, the session layer processing portion (S), the presentation layer processing portion (PR), and the application layer processing portion (A) (there is a case where the transport layer processing portion (T) is included) are inactive. On the other hand, when the test driver host 15 is not connected to the testing front-end processor 13 so that the simulating application programs 14 are expanded in the testing front-end processor 13, the above processing portions are activated.

The test driver system 200 has a function for converting or replacing the NSAP address. An address converting or replacing portion 22 is provided at a portion corresponding to a receiving-input/transmitting-output stage of the network layer processing portion (N). An additional definition information 23 required to operate the address converting portion 22 is added to the definition information operating portion 20.

Figure 7:
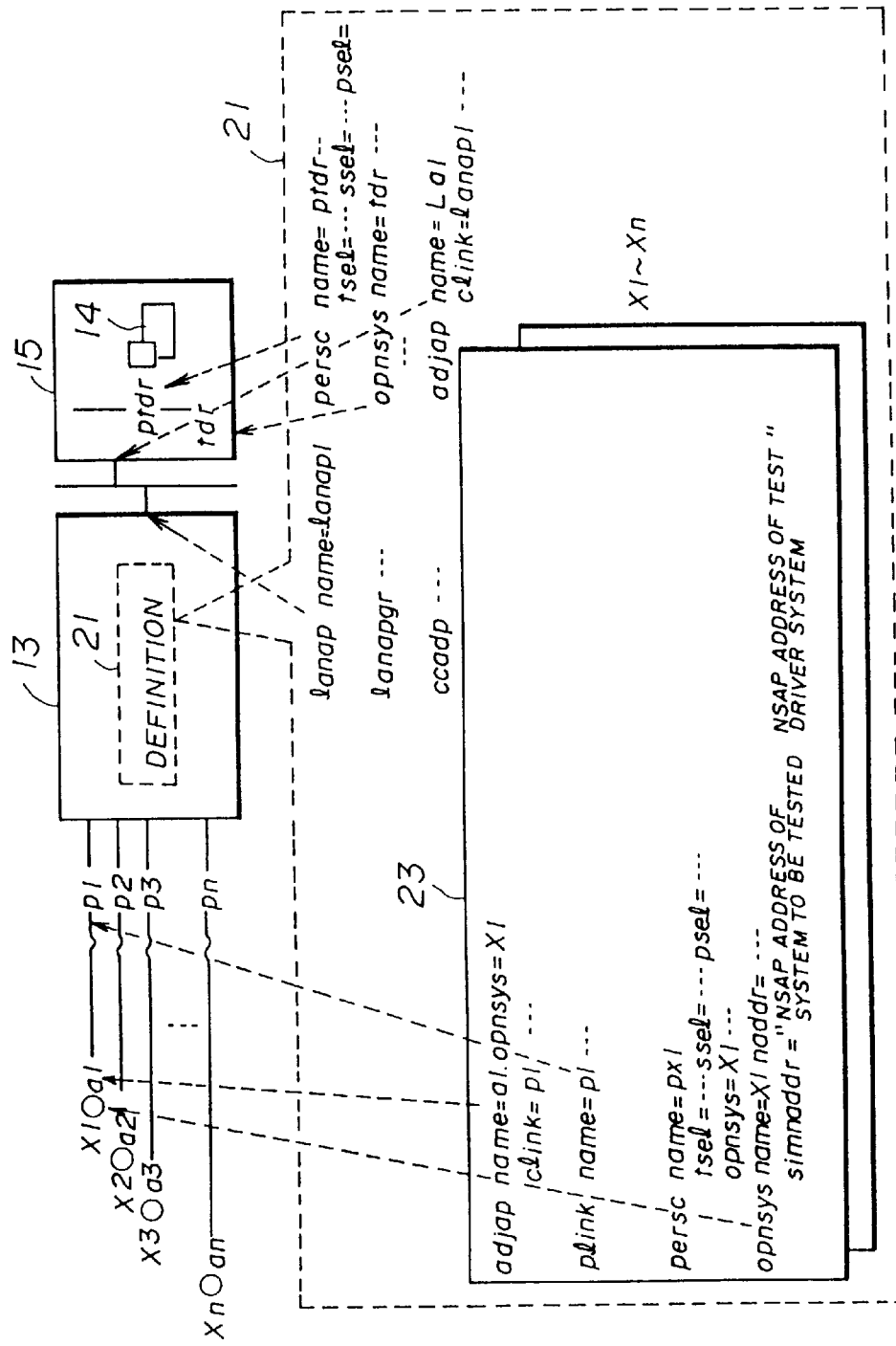
FIG. 7 is a diagram illustrating an example of an additional definition information.

FIG. 7 shows an example of the additional definition information 23 added to the definition information operating portion 20. In this example, the testing front-end processor 13 is connected to the front-end processor 12 of the communications system 100 by the lines used to connect the front-end processor 12 and the OSI terminals 11.

In this additional definition information 23, imaginary n OSI terminals 11 are represented by Xi (i=1, 2, . . . , and n), a line between each of the imaginary OSI terminals 11 and the host computer 10 of the communications system 100 to be tested is defined by a "plink" statement, and each of the imaginary OSI terminals 11 is defined as an open system by a "opnsys" statement. In this case, to perform the simulation, an NSAP address of the host computer 10 of the communications system 100 to be tested and an NSAP address of the test driver host 15 are indicated by a "simnaddr" operand of the "opnsys" statement. A "plink name" is indicated by a "clink" operand of an "adjap" statement, and Xi is indicated by an "opnsys" operand so that a path to each OSI terminal to be simulated is defined. An address of a layer above the network layer (N) is indicated by a "persc" statement, and correspondence to the "opnsys" statement is defined by an "opnsys" operand. The definition information other than the additional definition information 23 shown in FIG. 7 indicates communication definition information used in the communication between the testing front-end processor 13 and the test driver host 15.

As has been described above, the additional definition information 23 manages the NSAP addresses of the imaginary OSI terminals 11 as objects of network addresses to be replaced, and the NSAP address of the host computer 10 of the communications systems 100 to be tested and the NSAP address of the test driver host are managed so as to correspond to network addresses which are objects to be replaced.

Figure 8:
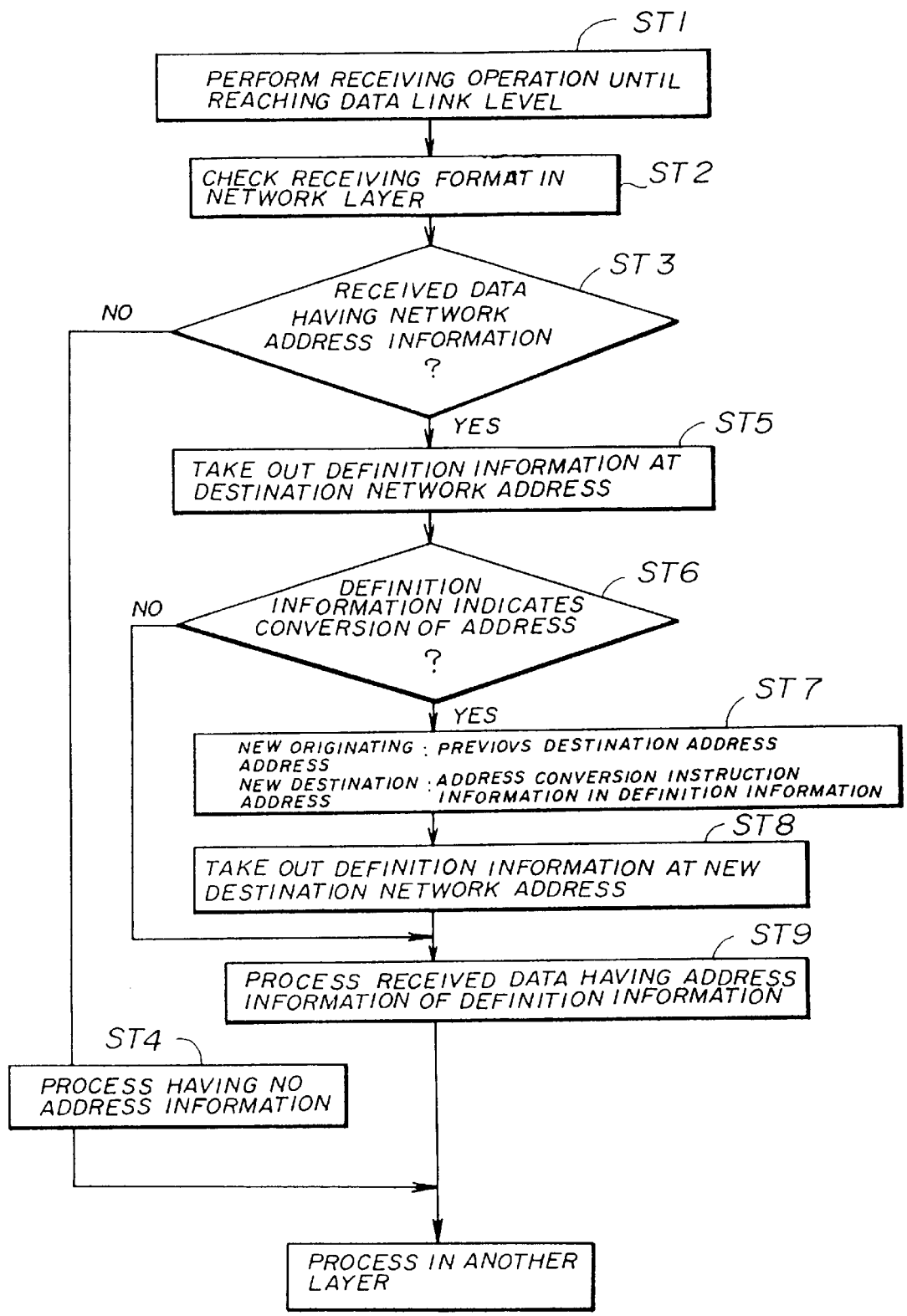
FIG. 8 is a flow chart illustrating an operation when a message is received.
Figure 9:
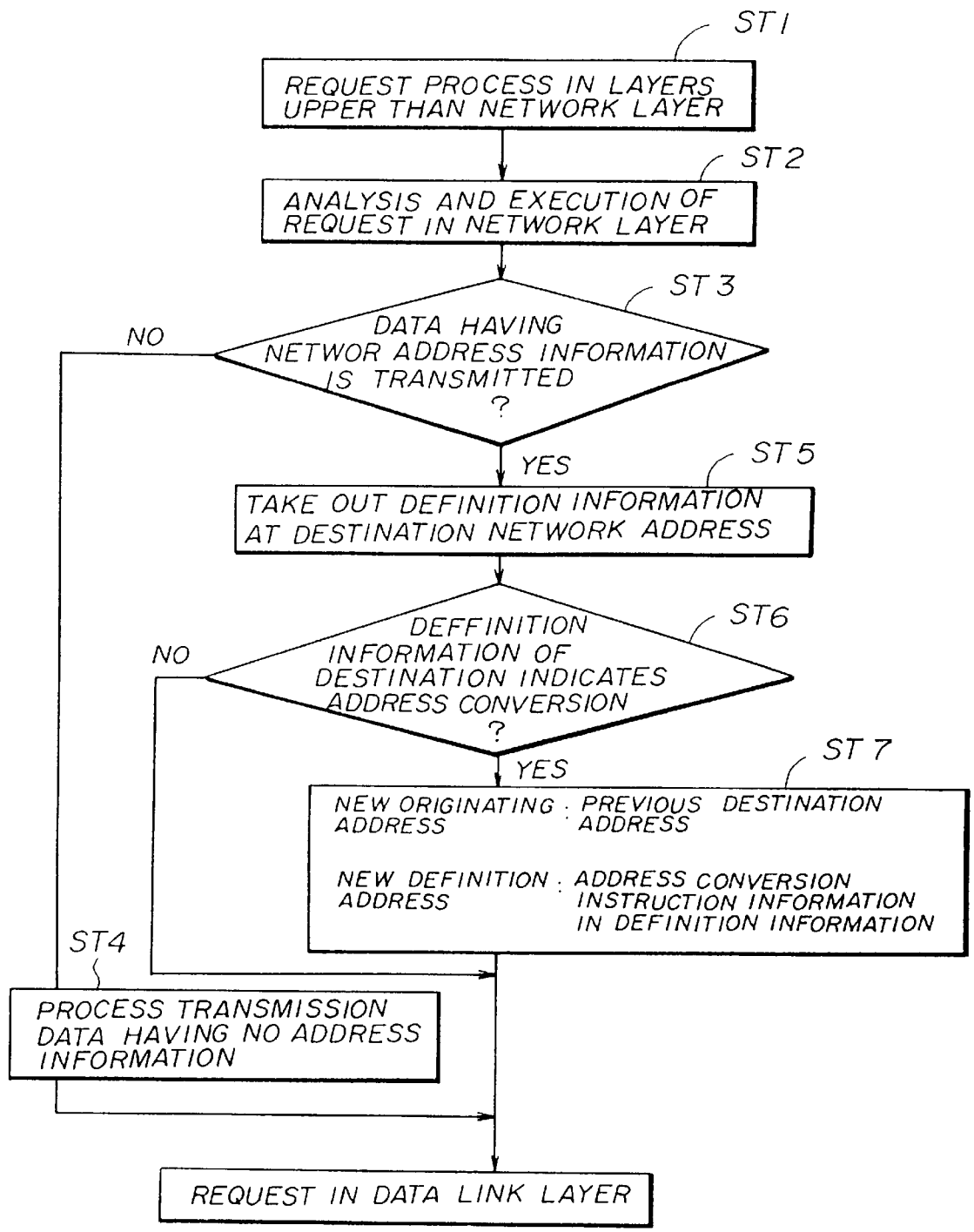
FIG. 9 is a flow chart illustrating an operation when a message is received.

FIG. 8 shows an example of a processing flow executed when a message is received in accordance with a communication control program loaded in the testing front-end processor 13. FIG. 9 shows an example of a processing flow executed when a message is transmitted in accordance with the communication control program.

In these processing flows, since the connection-oriented network protocol is used in the communication processing system, the transmission and reception of messages having network addresses of the destination and originating station as parameters are executed when the network connection is established, and after this, the transmission and reception of messages having no address information of the network layer (N) are executed.

A description will now be given of the processing flow shown in FIG. 8.

The communication control program stored in the testing front-end processor 18 is executed in accordance with the flow shown in FIG. 8. In step ST1, a receiving operation is executed in layers equal to or lower than the data link layer (DL). In step ST2, the receiving format in the network layer (N) is checked. It is then determined, in step ST3, whether or not a received message has network address information. If it is determined, in step ST3, that the received message has no network address information, the process proceeds to step ST4. In step ST4, received data having no address information is processed in the same manner as in the conventional case, the then the process proceeds into the transport layer (T).

On the other hand, if it is determined, in step ST3, that the received data has the network address information, in step ST5, the definition information 21 (including the additional definition information 23) pointed to by the destination network address is taken out. It is then determined, in step ST6, whether or not the additional definition information 23 taken out in step ST5 defines the destination network address as the object of the network address to be replaced so that the network address conversion or replacement is instructed. If it is determined, in step ST6, that the network address conversion is instructed, in step ST7, the destination network address which has been previously indicated is set as a new originating station network address, and the network address of the test driver host 15 which is managed by the additional definition information 23 so as to correspond to the previous destination network address is set as a new destination network address.

In step ST8, the definition information 21 pointed by the new destination network address is taken out, and then the received data having address information defined by the definition information 21 taken out in step ST8 is processed in step ST9. After this, the process proceeds into the transport layer (T).

Figure 10A:
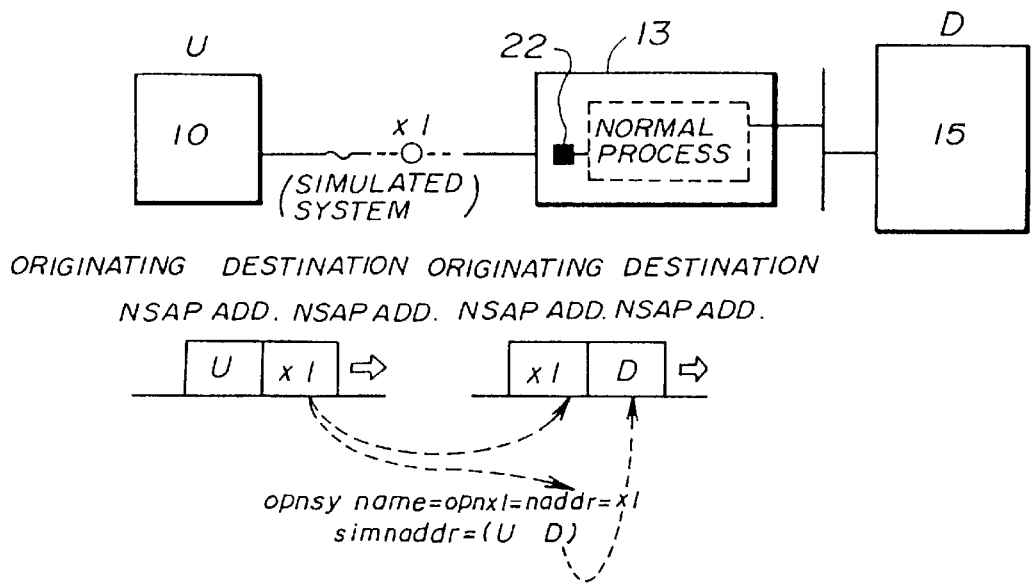
FIG. 10A is a block diagram illustrating a process for converting network addresses when a message is received.

According to the above process, as shown in FIG. 10A, when a message having the NSAP address "U" of the host computer 10 of the communications system 100 to be tested as the originating station network address and the NSAP address "X1" of an OSI terminal 11 as the destination network address is transmitted from the host computer 10 to the testing front-end processor 13, the network address converting or replacing portion 22 converts the message into a message having the NSAP address "D" of the test driver host 15 as the new destination network address and the NSAP address "X1" of the OSI terminal 11 as the new originating station network address, and the replaced message is transmitted to the test driver host 15. Thus, the test driver host 15 can receive, instead of the OSI terminal 11, the message which is transmitted from the host computer 10 to the OSI terminal 11. In the test driver host 15, the simulation programs 14 are activated in accordance with the received message, so that the process to be originally executed by the OSI terminal 11 can be simulated.

A description will now be given of the processing flow shown in FIG. 9.

When the testing front-end processor 13 receives a transmission request of the processing results from the test drive host 15 which has executed the simulation programs 14, the communication control program loaded in the testing front-end processor 13 is executed in accordance with the flow shown in FIG. 9. In step ST1, request processes in layers equal to or above the network layer (N) are executed. In step ST2, the request in the network layer (N) is analyzed and a process in response to the request is carried out. After this, it is determined, in step ST3, whether or not a message to be transmitted has network address. If it is determined, in step ST3, that the message to be transmitted has no network address, the process proceeds to step ST4. In step ST4, the transmission data having no network address is processed in the same manner as in the conventional case, and then the process proceeds into the data link layer (DL). ON the other hand, if it is determined, in step ST3, that the message to be transmitted has the network address, in step ST5, the definition information 21 (including the additional definition information 23) pointed to by the destination network address provided in the transmission message is taken out. It is then determined, in step ST6, whether or not the additional definition information 23 taken out in step ST5 defines the destination network address as the object of the network address to be converted so that the network address replacement is instructed. If it is determined, in step 6, that the network address replacement is instructed, in step ST7, the destination network address which has been originally indicated is set as a new originating station network address, and the network address of the host computer 10 of the communications system to be tested, which network address is managed by the additional definition information 23 so as to correspond to the destination network address, is set as a new destination network address. After this, the process proceeds into the data link layer (DL). If it is determined, in step ST6, that the network address conversion is not instructed, the process directly proceeds into the data link layer (DL) without executing the process in step ST7.

Figure 10B:
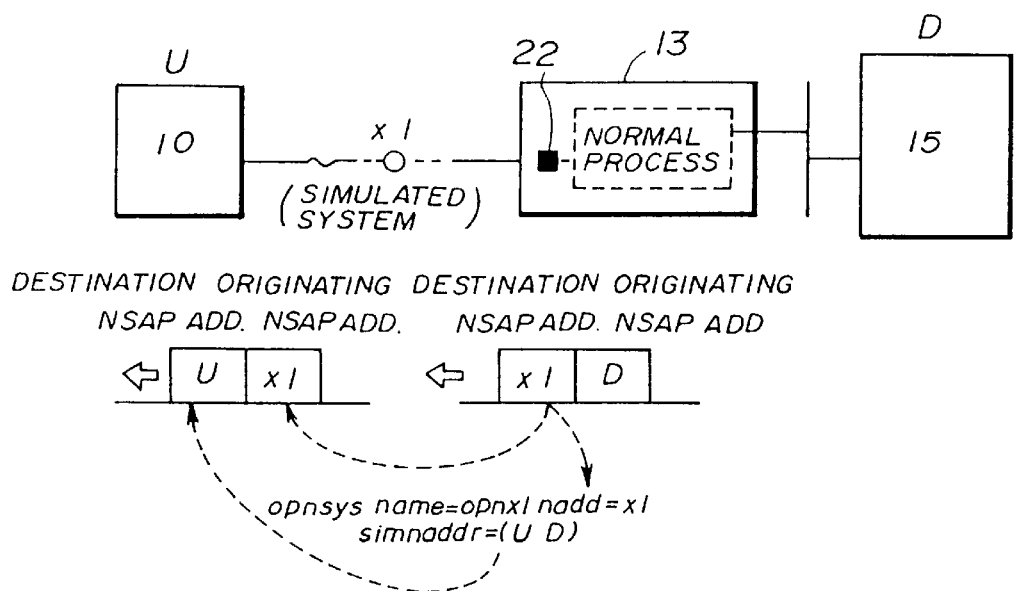
FIG. 10B is a block diagram illustrating a process for converting network addresses when a message is transmitted.

According to the above process, as shown in FIG. 10B, when a transmission request of the message regarding the result of the simulating process is output from the test driver host 15, the message having the NSAP address "D" of the test driver host 15 as the originating station network address and the NSAP address "X1" of the OSI terminal 11 as the destination network address, the network address converting or replacing portion 22 provided in the testing front-end processor 13 converts the message into a message having the NSAP address "U" of the host computer 10 as the destination network address and the NSAP address "X1" as the originating station network address, and transmits the message to the host computer 10. Thus, the test driver host 15 can inform the host system 10 of the communications system 100 to be tested of the results of the simulating process executed in accordance with the simulating programs 14.

As has been described above, according to the processes executed in accordance with the flows shown in FIGS. 8 and 9, the test driver system 200 having the testing front-end processor 13 and the test driver host 15 receives, instead of the OSI terminals 11, the messages transmitted from the host computer 10 of the communications system 100 to be tested and simulates processes of the OSI terminals 11 based on the received messages, and the results of the simulating process is returned to the host computer 10 of the communications system 100 to be tested. As a result, the test of the network system between the host computer 10 and the OSI terminals 11 can be carried out.

Figure 11:
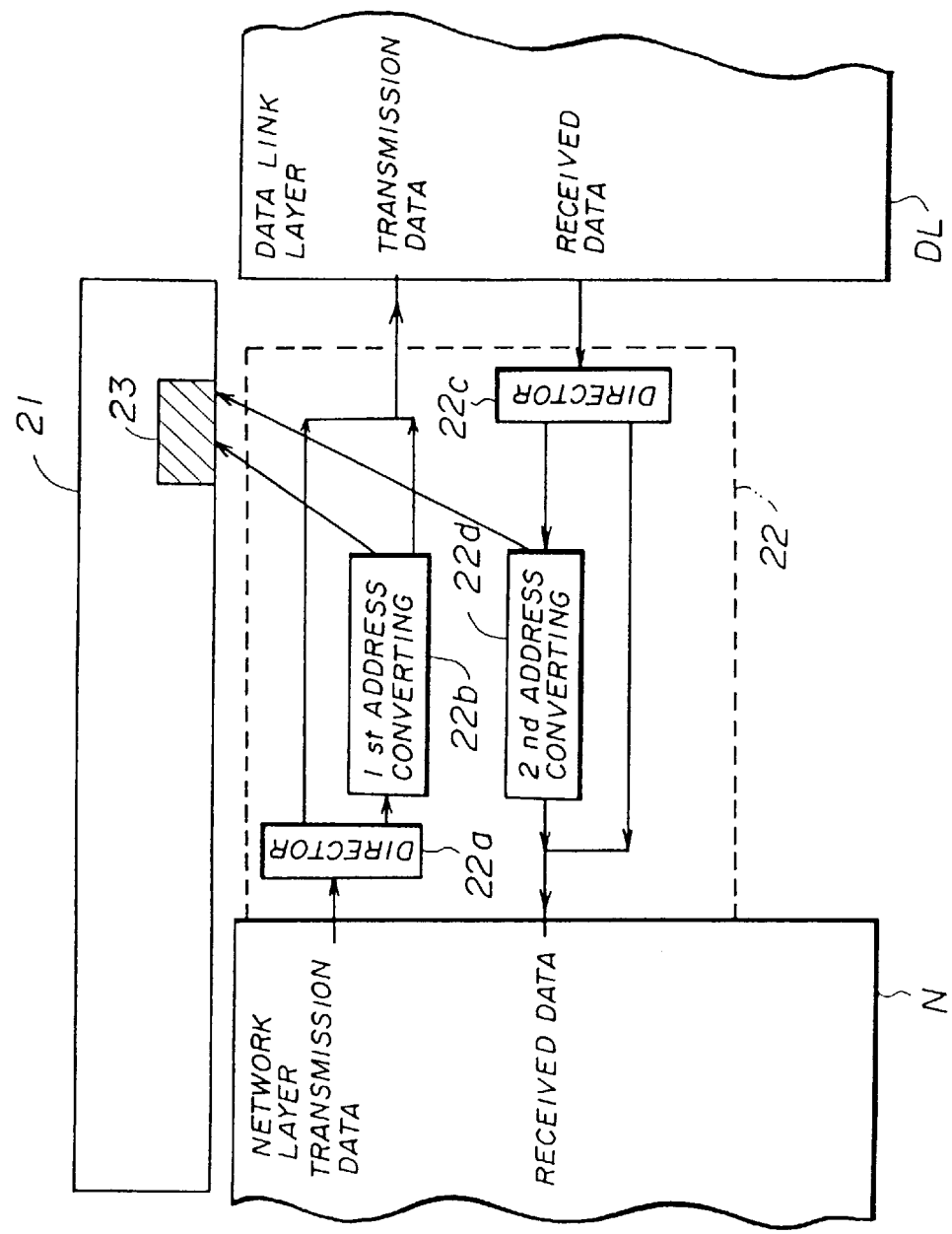
FIG. 11 is a block diagram mainly illustrating a structure of an address converting portion.

FIG. 11 shows an essential functional structure of the address converting or replacing portion 22 which structure corresponds to the flows shown in FIGS. 8 and 9. Referring to FIG. 11, the address converting or replacing portion 22 has a first director function 22a, a first address converting function 22b activated at a time of the transmission process, a second director function 22c and a second address converting function 22e activated at a time of the receiving process. In using of the connection-oriented network protocol, the first director function 22a directs the transmission data to the first address converting function 22b or to the data link layer processing portion (DL) in accordance with whether or not the transmission data has the network address. The second director function 22c directs the received data to the second address converting function 22d or to the network layer processing portion (N) in accordance with whether or not the received data has the network address information. The first and second director functions 22a and 22c also carry out the directing operation in accordance with the operation mode (the testing operation or the actual operation).

To prevent the conditions in the test of the network system between the host computer 10 and the OSI terminals 11 from differing from the conditions in the actual operation of the host computer 10 of the communications system 100, it is preferable that the number of lines connecting the testing front-end processor 13 to the front-end processor 12 be the same as the number of lines used to actually connect the front-end processor 12 to the OSI terminals 11. If the same number of lines is not prepared in the test, the testing front-end processor 13 can be connected, using a relay system 30, to the front end processor 12 by the smaller number of lines than the number of lines actually connecting the testing front-end processor 13 to the front-end processor 12, as shown in FIG. 12.

Figure 12:
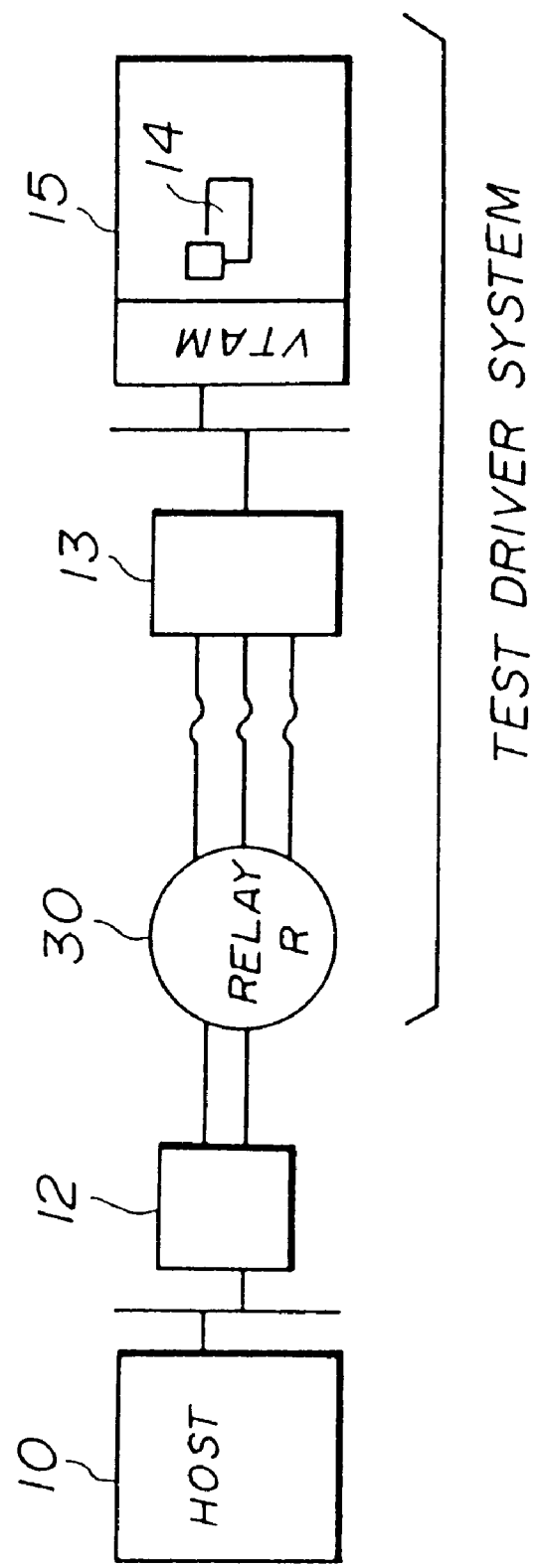
FIG. 12 is a block diagram illustrating another example of the connection of the communications system to be tested and the test driver system.

Referring to FIG. 12, the test driver system 200 has the test driver host 15, the testing front-end processor 13 and the relay system 30. The testing front-end processor 13 is connected to the relay system 30 by the same number of lines as in the actual communication processing system in which the communications system 100 is connected to the OSI terminals 11 by lines. The relay system 30 is connected to the front-end processor 12 of the communications system 100 by lines, the number of which is less than the number of lines connecting the relay system 30 and the testing front-end processor 13.

Figure 13:
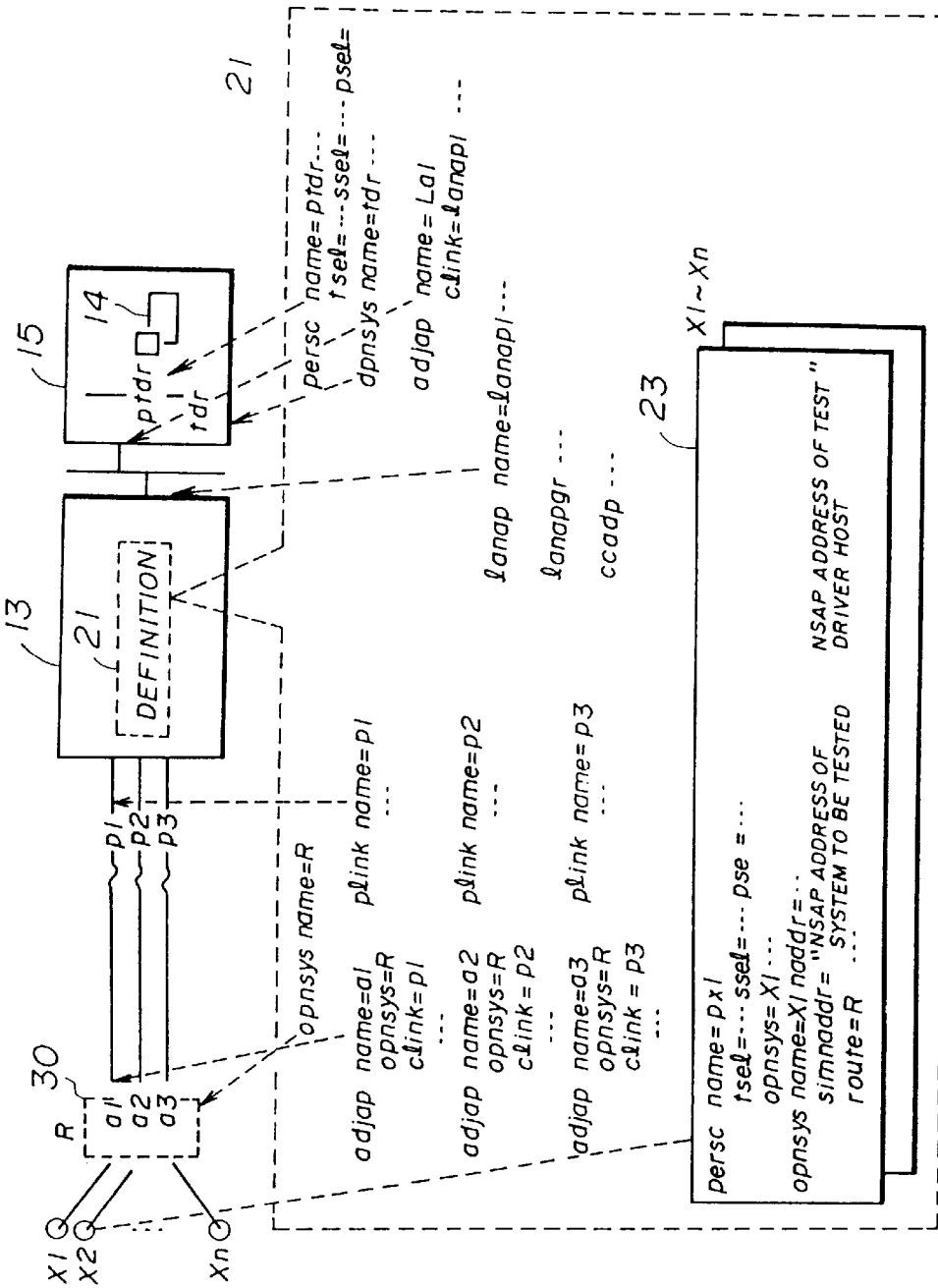
FIG. 13 is a diagram illustrating the additional definition information applied to the system shown in FIG. 12.

In this test driver system 200, the additional definition information 23 is formed as shown in FIG. 13. That is, the additional definition information 23 defines a relay system through which information passes.

The present invention is not limited to the aforementioned embodiments, and variations and modifications may be made without departing from the scope of the claimed invention.

For example, the destination network address may be converted into a network address of another communications system. In addition, a plurality of network addresses may be assigned to the test driver system. In this case, different network addresses respectively corresponding to communications systems to be simulated are used for messages, so that different simulation programs are activated for respective simulated communications systems.

What is claimed is:

1. A communication system in a communication processing system including a plurality of communications system connected to each other by a network, each of said plurality communications systems being identified by an address in the network, a message including an originating address and a destination address being transmitted through said network, the originating address being an address identifying one communications system which transmits the message, the destination address being an address identifying another communications system to which the message should be transmitted, said communication system comprising:

management means for managing a plurality of converting addresses and a receiving address, wherein the converting addresses identifying virtual communication systems to be simulated and the receiving address is an address of a communication system to receive the message;

determining means for determining, when said communication system receives the message including the originating address and the destination address, whether the destination address is identical with one of the converting addresses; and converting means for converting both the destination address into a new destination address of the message and the originating address into a new originating address of the message if the determining means determines that the destination address is identical with one of the converting addresses, wherein the new destination address is identical with the receiving address and the new originating address is identical with the destination address which has not yet been converted;

wherein said communication system recognizes that the converted message is received from a virtual communication system having an address corresponding to the new originating address; and wherein the receiving address corresponds to the address of said communication system and said communication system processes the message.

2. The communication system as claimed in claim 1, further comprising:

simulating means for simulating operations of a virtual communication system identified by one of said converting addresses.

3. A communications system in a communication processing system including a plurality of communications systems connected to each other by a network, each of said plurality of communications systems being identified by an address in said network, a message including an originating address and a destination address being transmitted through said network, the originating address being an address identifying one communications system which transmits the message, the destination address being an address identifying another communication system to which the message should be transmitted, said communications system comprising:

management means for managing a plurality of converting addresses and a receiving address, wherein the converting addresses identify virtual communication systems to be simulated and the receiving address is the address of a communication system to receive the message;

determining means for determining, when said communication system transmits the message including the originating address and the destination address, whether the destination address is identical with one of the converting addresses; and converting means for converting both the destination address into a new destination address of the message and the originating address into a new originating address of the message if the determining means determines that the destination address is identical with one of the converting addresses, wherein the new destination address is identical with the transmitting address and the new originating address is identical with the destination address which has not yet been converted;

wherein the message with the new originating and destination addresses is transmitted through the network according to the new destination address and another communication system recognizes that the message is received from a virtual communication system corresponding to the new originating address.

4. The communication system as claimed in claim 3, further comprising:

simulating means for simulating operations of a virtual communication system identified by one of said converting addresses.

5. A communication system in a communication processing system including a plurality of communications systems connected to each other by a network, each of said plurality of communications systems being identified by an address in said network, a message including an originating address and a destination address being transmitted through said network, the originating address being an address identifying one communications system which transmits the message, the destination address being an address identifying another communications system to which the message should be transmitted, said communication system comprising:

management means for managing a plurality of converting addresses and a receiving address, wherein the converting addresses identify virtual communication systems to be simulated and receiving address is the next communication system to receive the message;

determining means for determining, when said communication system receives the message including the originating address and the destination address, whether the destination address is identical with one of the converting addresses; and converting means for converting both the destination address into a new destination address of the message and the originating address into a new originating address of the message if the determining means determines that the destination address is identical with one of the converting addresses, wherein the new destination address is identical with the receiving address and the new originating address is identical with the destination address which has not yet been converted;

wherein said communication system recognizes that the message is received from a virtual communication system having an address corresponding to the new originating address; and wherein the receiving address corresponding to an address of another communication system in the network and the message with the new originating address and the new destination address is transmitted through the network.

* * * * *